United States Patent Office 3,369,642
Patented Feb. 20, 1968

3,369,642
APPARATUS FOR REMOVING TIPPED-OVER
BOTTLES FROM A CONVEYOR
Roy K. Hennig, Cincinnati, Ohio, assignor to Richardson-Merrell Inc., New York, N.Y., a corporation of Delaware
Filed June 17, 1966, Ser. No. 558,498
2 Claims. (Cl. 198—33)

ABSTRACT OF THE DISCLOSURE

Automatic means for removing tipped-over bottles from conveyor comprising a rotor having arms extending across the path of said bottles to receive upstanding moving bottles between arms and to be rotated thereby but pushing a tipped-over bottle off the conveyor and through opening between a high and low guide rail into a container.

---

This invention relates to apparatus for removing tipped-over bottles from a conveyor. More particularly, this invention relates to removing tipped-over bottles from a conveyor wherein the bottles are normally conveyed in an upright position and are being constrained to move in a single line or row on the conveyor between guide means.

An apparently inherent characteristic of a high-speed bottling line is the occasional presence of a tipped-over bottle at various places in the line. To solve this problem, equipment exists which has built-in safety features which automatically stop a machine before the tipped-over bottle can cause serious damage. However, the troublesome bottle must then be located and manually removed and depending on the machine in question, part of the machine must be re-timed or the safety device reset and finally the machine must be re-started. Also, frequently all machines upstream of the machine in question stop automatically when trouble occurs. Therefore, they also must be re-started once the tipped-over bottle is cleared. Apparatus has been devised for removing tipped-over bottles from a conveyor, for example, such as that described in U.S. Patent 3,097,732, which issued on July 16, 1963. However, the apparatus described in the patent performs its function by different means from that of this invention and, with some of the more popular conveyor systems it requires changes and adjustments to the guide means on either side of the conveyor.

An apparently popular form of guide means is that of two pairs of parallel bars, namely a high and a low rail on each side of the bottle being conveyed. In this invention a vaned rotor is mounted beside the conveyor so that the vanes turn in a horizontal plane and mesh with the bottles as they pass. The space between adjacent vanes can accommodate an upstanding bottle but is too narrow to accommodate a tipped-over bottle. The bottles are in single file and in contact with each other (choked condition) as they pass the rotor and at least several bottle diameters upstream, since it is the back pressure of the bottles that cause the rotor to turn. The two guide rails directly opposite from the rotor are modified, if necessary, so that they still perform their guiding function, but also have enough space between them to allow a bottle in the tipped-over position to pass between them. As the tipped-over bottle tries to advance past the rotor by virtue of the back pressure of the upstream bottles, it cannot mesh with the vanes and is pushed to the side and off of the conveyor by the tips of the vanes and into a container for rejected bottles.

In addition to bottles the invention can be employed with other articles which have circular or cylindrical sides, e.g., oil cans. In any event, the height of the article is greater, e.g., in a ratio of at least 1.5 to 1, than its width or diameter.

It is a primary object of this invention to devise apparatus for ejecting tipped-over bottles from a conveyor wherein the apparatus can be installed with minimum modification of the existing conveyor system and wherein the apparatus is efficient and inexpensive.

Other objects and advantages of this invention will become apparent from the following description and the drawings, where identical numerals refer to identical parts, and wherein:

FIG. 4 is a side elevation of the apparatus shown in FIG. 1.

Figure 1:
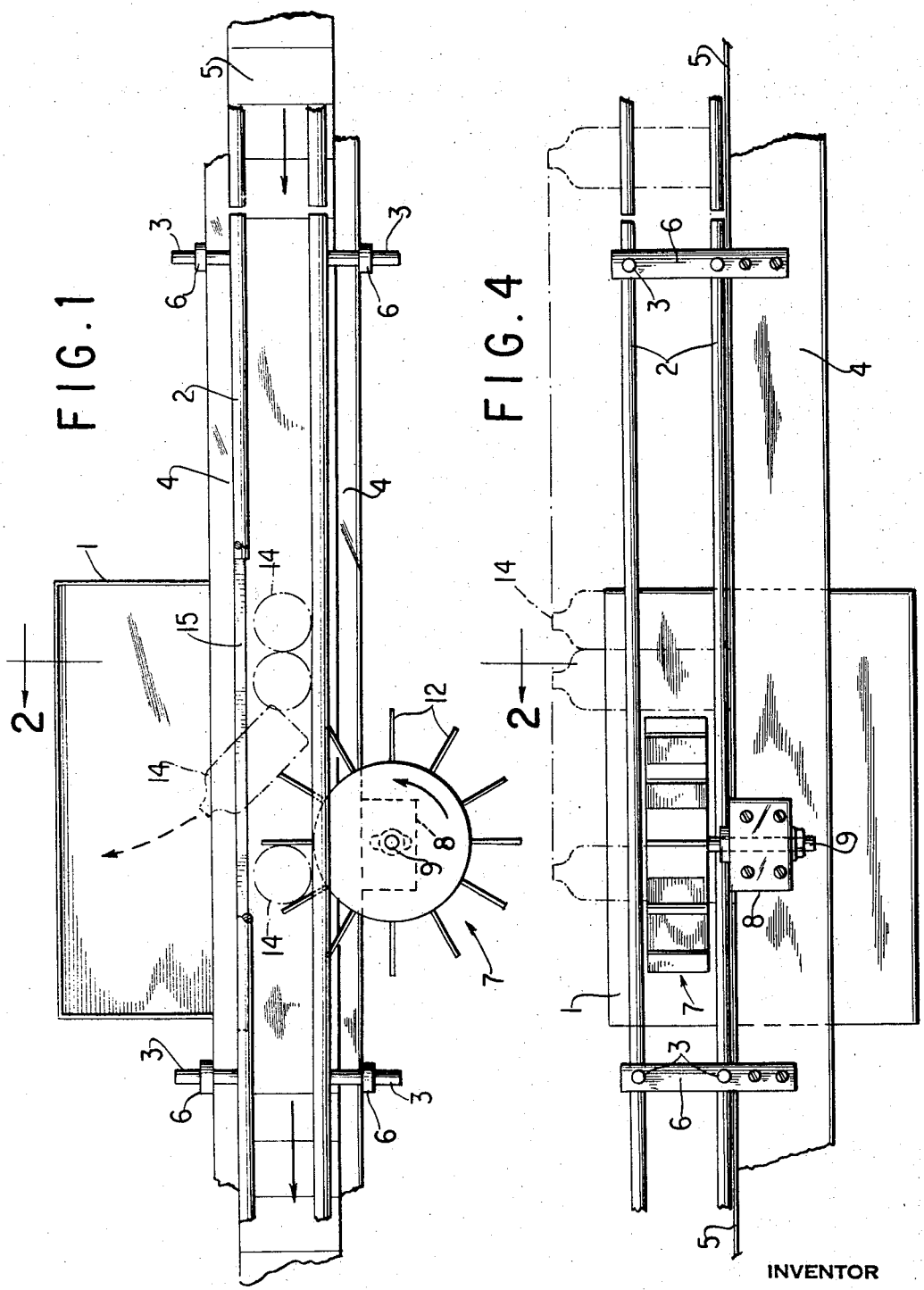
FIG. 1 is a plan view of the apparatus of this invention and its operation.
Figure 2:
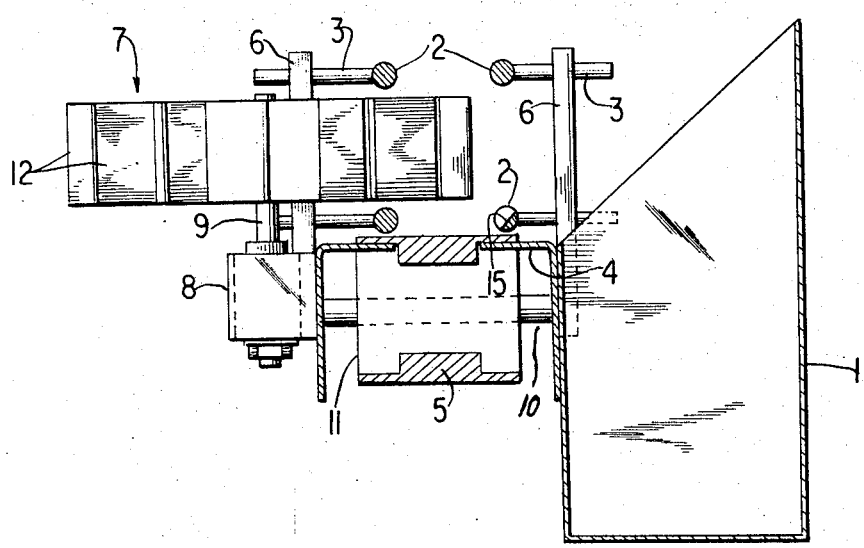
FIG. 2 is a plan view of the apparatus of FIG. 1 taken on the line 2—2.
Figure 3:
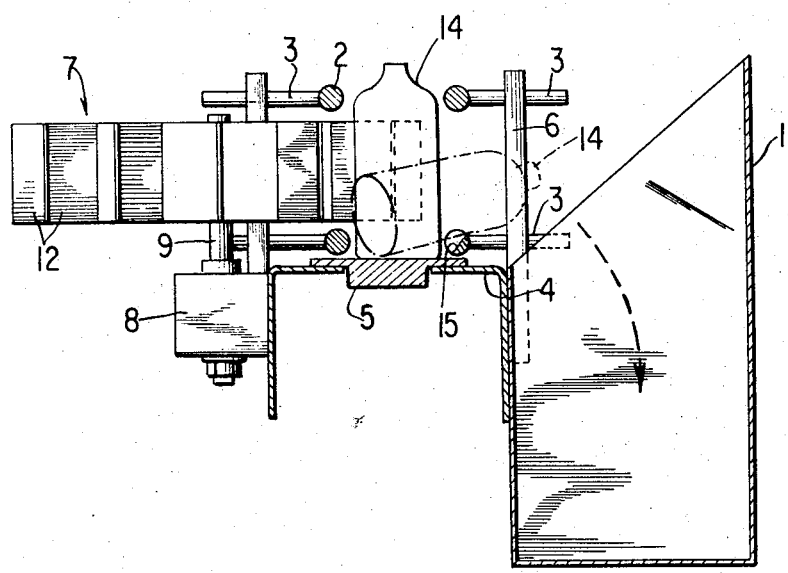
FIG. 3 is a plan view of the apparatus shown in FIG. 1 taken on the line 2—2 showing a bottle being ejected from the conveyor.

Referring now to the drawings, an endless belt conveyor is shown which comprises a conveyor bed 4, having supporting bars 6, on which guide rails 2 are mounted by adjusting arms 3. A sprocket shaft 10 carries belt sprocket 11 over which the conveyor belt 5 moves in the direction of the arrow in FIG. 1. Mounted on one side of the conveyor is a rotor 7 on vertical shaft 9 which is supported on the conveyor bed 4 by plate 8. The rotor 7 has a plurality of vanes 12. The vanes are spaced to freely accept the bottle in the upright position and the vane lengths are about equal to the diameter of the bottle. The conveyor belt 5 carries a single row of bottles 14 on a predetermined path between the guide rails. Means, not shown in the drawings, power the movement of the endless belt in the indicated direction. Opposite from the rotor on the conveyor is discard bottle can 1. The lower guide rail opposite the rotor has a beveled surface 15 to facilitate the sliding or rolling of the tipped-over bottles thereover. Also, the height of this lower guide rail is below that of the bottle radius.

The operation of the apparatus can be readily perceived from the drawings. The conveyor belt moves a row of bottles on a predetermined path. The bottles are in a single row and in contact with each other, that is, a choked feed. Each upright bottle fits or meshes between the vanes of the rotor and are conveyed towards their destination. The tipped-over bottle, however, does not fit between the vanes since its height is greater than its diameter, which in turn is greater than the spacing between the vanes in the path of the bottles. The tipped-over bottle is moved along the conveyor and when it comes in contact with the edge of the vane it is pushed forward by the action of the conveyor and the bottles behind it. In addition to being pushed forward it is pushed laterally away from the rotor by the vane edges and over the beveled side 15 of the lower guide rail into the discard bottle can.

What is claimed is:

1. In conveyor apparatus for articles of the type having circular sides and a height at least 1.5 times greater than their diameter, wherein the articles are moved in one normally upstanding row in article-to-article contacting relationship along a predetermined path between guide means, said guide means comprising a pair of upper and lower rails, the improvement for removing tipped-over articles which comprises an upstanding freely rotatable turnstile on one side of the conveyor, the arms of said turnstile disposed substantially across the path of said articles, the space between said arms in the article path over the conveyor suitable for receiving an upright article to rotate said turnstile but insufficient to receive a tipped-over article, rotation of said turnstile due solely to contact with said articles, the top of the guide mean rails being below the top of said article and having an opening therebetween sufficiently large to permit a tipped-over article to be pushed off of the conveyor and over the lower rail by the ends of the turnstile arms, said lower rail being below the radial center of said article, and a container adjacent but outwardly of said lower rail opposite the turnstile for receiving the tipped-over articles.

2. In conveyor apparatus for cylindrical bottles of the type having a height at least 1.5 times greater than their diameter, wherein the bottles are moved in one normally upstanding row in bottle-to-bottle contacting relationship along a predetermined path between guide means, said guide means comprising a pair of upper and lower rails, the improvement for removing tipped-over bottles which comprises a freely rotatable upstanding rotor on one side of the conveyor, a plurality of radial vanes mounted on the periphery of said rotor, said vanes disposed in the path of said bottles and extending substantially across the path of the bottles, the space between said vanes suitable for receiving an upright bottle therebetween to rotate said vanes but insufficient to receive a tipped-over bottle, the rotation of said rotor due solely to contact with said bottles, the height of the rails opposite said rotor being below the top of said bottles and having an opening therebetween sufficiently large to permit a tipped-over bottle to be pushed off of the conveyor and over the lower rail, said lower rail having a height less than the radius of said bottle and a flat upwardly beveled surface facing the rotor enabling a tipped-over bottle to be pushed thereover, and a container adjacent but outwardly of said lower rail opposite the rotor for receiving the tipped-over bottle.

References Cited
UNITED STATES PATENTS

| | | | |
|---|---|---|---|
| 1,258,623 | 3/1918 | Stake et al. | 198—22 |
| 1,502,201 | 7/1924 | Jaeger | 198—22 |
| 2,368,738 | 2/1945 | Bergmann | 198—34 X |
| 2,368,796 | 2/1945 | Ardell | 198—34 X |
| 2,556,082 | 6/1951 | Hartness | 198—40 X |
| 3,097,732 | 7/1963 | Engelson et al. | 198—33 |

EVON C. BLUNK, *Primary Examiner.*

R. J. HICKEY, *Assistant Examiner.*